United States Patent
Bouchet

[11] 3,721,530
[45] March 20, 1973

[54] REACTOR FOR PREPARATION OF CHLOROHYDRINS OF 1,2-GLYCOLS

[75] Inventor: Robert Bouchet, Martigues, France
[73] Assignee: Naphtachimie, Paris, France
[22] Filed: Jan. 12, 1971
[21] Appl. No.: 105,917

[30] Foreign Application Priority Data

Jan. 13, 1970 France..................................7000985

[52] U.S. Cl......................23/285, 23/288 E, 23/283, 261/76, 261/123, 260/683 R, 260/633, 260/648 R, 260/660, 260/694, 259/4, 259/95
[51] Int. Cl.............................C07c 17/02, B01j 1/00
[58] Field of Search..........23/285, 288 E, 252 R, 260, 23/284, 283, 1 R, 273 R; 261/76, 123; 260/683, 633, 648, 660, 694; 259/4, 95; 55/257, 259

[56] References Cited

UNITED STATES PATENTS 3,426,095    2/1969    Passley..........................23/288 E X Primary Examiner—James H. Tayman, Jr.
Attorney—McDougall, Hersh & Scott

[57] ABSTRACT

A chemical reactor comprising a generally cylindrical reaction vessel, a series of three jackets defining a central chamber and three annular chambers within the reactor, means for feeding a first gaseous reactant, such as chlorine, to the lower portion of the first annular chamber to displace liquid reaction medium therein to the centrally disposed chamber for flow downwardly therethrough, means for introducing a second gaseous reactant, such as an ethylenic hydrocarbon, to the third annular chamber to cause flow of the liquid reaction medium therein upwardly therethrough to the second annular chamber for reaction with the reaction product of the chlorine and water in the liquid reaction medium to thereby minimize the production of chlorinated alkanes.

5 Claims, 1 Drawing Figure

PATENTED MAR 20 1973 3,721,530
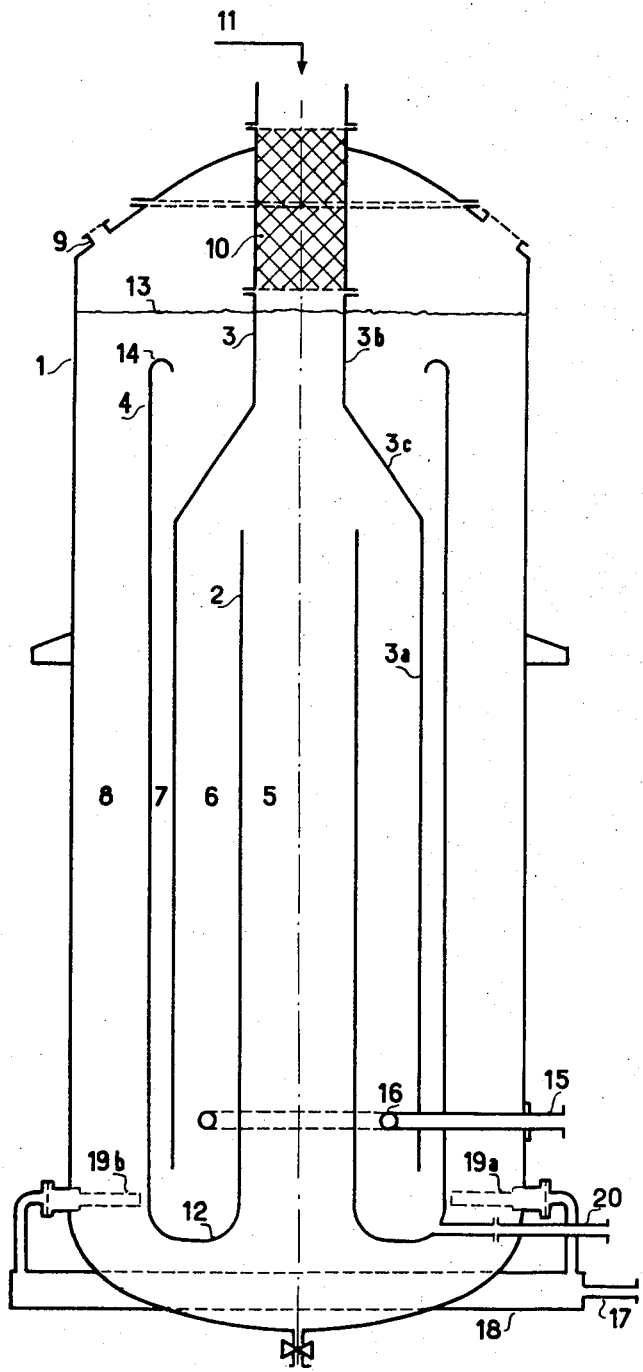
INVENTOR.
Robert Bouchot
BY McDougall, Hersh &
Scott
Attorneys

REACTOR FOR PREPARATION OF CHLOROHYDRINS OF 1,2-GLYCOLS

This invention relates to a chemical reactor and more particularly to a reactor for the continuous preparation of monochlorohydrins of 1,2-glycols from chlorine, ethylenic hydrocarbons and water. The reactor is particularly well suited for the preparation of 1,2-propylene glycol monochlorohydrin, with a view to preparing 1,2-propylene oxide.

The manufacture of a 1,2-glycol monochlorohydrin from chlorine, an ethylenic hydrocarbon and water generally involves first preparing a hydrochloric solution of hypochlorous acid by reacting chlorine and water, and then contacting the ethylenic hydrocarbon with this solution. The hypochlorous acid reacts with the ethylenic hydrocarbon to form the monochlorohydrin of the corresponding glycol. The process can be carried out continuously by causing chlorine to react on the reaction liquid in a first vessel, then adding the ethylenic hydrocarbon to the reaction liquid from the first vessel in a second vessel, and finally continuously removing a small fraction of the reaction liquid from the second apparatus and recycling the remaining fraction of the reaction liquid to the chlorine-water reaction vessel while adding water to compensate for the water consumed.

In order to avoid the formation of undesirable by-products, such as chloroalkanes, it is necessary on the one hand to limit the chlorine content of the reaction liquid generally by using high liquid recirculating rates, and on the other hand, to avoid as far as possible the presence of bubbles of ethylenic hydrocarbon in the recycled reaction liquid. It is difficult in practice to obtain the above conditions simultaneously, since high recirculating rates for the reaction liquid require a large supply of the liquid, and a large supply creates turbulence which encourages the formation of small bubbles of ethylenic hydrocarbon and the carrying of the bubbles towards the reaction of chlorine with water.

In order to resolve these difficulties it has been proposed to interconnect the reaction vessels by means of pipes of large section, as a means of limiting the formation of turbulence as far as possible. This has only partially resolved the difficulties mentioned, since the flow of liquid in the pipes necessarily causes contractions in the flowing liquid, which encourages the formation of turbulence. Moreover, the various reagents are not distributed homogeneously, due to the fact that they are introduced locally. This method also involves serious difficulties, partly because of the large quantities of liquid which have to be circulated between the reaction vessels, particularly for installations with an average or large production capacity, and partly because of the need to use corrosion resistant construction materials, such as titanium, which has the drawback of being ill-adapted to making complex apparatus. The difficulties are further increased when the installation is used at pressures higher than atmospheric pressure.

It is accordingly an object of this invention to provide a chemical reactor for use in the preparation of monochlorohydrins of 1,2-glycols which provides minimum turbulence to thereby minimize the production of dichloroalkanes.

This and other objects and advantages of the invention will appear more fully hereinafter, and, for purposes of illustration, and not of limitation, an embodiment of the invention is shown in the accompanying drawing.

The reactor according to the invention provides a simple, effective solution to the difficulties described above. The reactor, which is applicable to the continuous preparation of monochlorohydrins of 1,2-glycols from chlorine, an ethylenic hydrocarbon and water, essentially comprises a cylindrical casing with a vertical axis, three cylindrical jackets located inside the casing and substantially coaxial with one another and with the casing, the first of these jackets, located nearest to the axis of the reactor, and the third jacket being interconnected by their lower portions, and the second jacket communicating via its upper portion with the outside of the casing, the three jackets and the casing thus defining three annular spaces and one cylindrical space which are coaxial and which communicate successively with one another via their upper or lower portions; the reactor further comprises a device located towards the lower end of the peripheral annular space for the continuous introduction of the ethylenic hydrocarbon, a device located in the inner annular space for the continuous introduction of the chlorine, a device for the introduction of the water and a device located in the lower portion of the intermediate annular space for the continuous removal of a fraction of the reaction medium containing the monochlorohydrins of 1,2-glycols.

A preferred embodiment of the invention is shown in section in the FIGURE. In this figure, the casing 1 and the three jackets 2, 3, and 4, of the apparatus are all circular in section and define a cylindrical space 5 and annular spaces 6, 7 and 8. The casing 1 contains a vent 9 through which the excess ethylenic hydrocarbon escapes. The intermediate jacket 3 is made up of two cylindrical portions 3a and 3b connected by a frusto-conical portion 3c, the portion 3a being larger in section than the portion 3b. The non-dissolved chlorine and the inert gases liable to accompany it leave the reactor from inside the portion 3b of the jacket 3. The portion 3b comprises a chlorine washer 10 which is sprayed, by means of the pipe 11, by the water required for the operation. The inner jacket 2 is limited in height to the base of the frusto-conical portion of 3c of the jacket 3. The jackets 2 and 4 are connected in their lower portions by a continuous spout 12. The upper part of the jacket 4 is immersed in the reaction liquid, the level of which is represented by the line 13; the depth of the liquid is substantially equal to the distance between the jacket 4 and the casing 1, so that the reaction liquid flowing from the annular space 8 to the annular space 7 does not undergo any contraction. In order that the flow should be disturbed as little as possible, the upper part of the jacket 4 is equipped with a rounded flange 14. The reactor is fed with chlorine by means of the pipe 15 and the diffuser 16 which distributes the chlorine over a section of the annular space 6; the reactor is fed with ethylenic hydrocarbon by means of a pipe 17, an annular distribution box 18 and diffusers 19, spread over a section of the annular space 8; these diffusers 19, two of which are shown in the FIGURE at 19a and 19b, are in the form of porous porcelain or ceramic filter candles held in position by a strap (not shown). The pipe 20 serves to evacuate a fraction of the reaction medium containing the 1,2-glycol monochlorohydrin.

The reactor according to the invention is used in the following manner, referring to the FIGURE described above.

When the reactor has been partially filled with water and purged with nitrogen, chlorine and ethylenic hydrocarbon, both in gaseous form, are introduced through pipes 15 and 17, respectively. The gas bubbles, rising into the annular spaces 6 and 8, create an ascending movement of the liquid present in the spaces according to the known principle of the "airlift." While the chlorine is in the annular space 6 it dissolves partially in the water, to form, in solution, hypochlorous acid and hydrochloric acid. The excess chlorine escapes from the reactor through the upper part of the space 5; this excess chlorine is washed and partially dissolved in the washer 10 by the water introduced through the pipe 11. The aqueous solution leaving the annular space 6 passes into the cylindrical space 5, in which it descends until it passes into the cylindrical space 5, in which it descends until it passes into the annular space 8. In this space the liquid is moved upwards by the bubbles of the ethylenic hydrocarbon. Uniform distribution of the ethylenic hydrocarbon can easily be obtained over each section of the space 8, because of the annular shape of the latter. Moreover, since this space can easily be large in section because of its peripheral position, it is possible to feed large supplies of ethylenic hydrocarbon into the reactor. During the ascent into the space 8, the ethylenic hydrocarbon is partially dissolved in the hydrochloric solution of hypochlorous acid coming from the space 5, to form 1,2-glycol monochlorohydrin which remains in solution. The excess ethylenic hydrocarbon leaves the reactor through the vent 9. In the upper part of the annular space 8 the liquid passes into the upper part of the annular space 7, the broad section of which encourages the tranquilizing of the liquid and the degassing of the non-dissolved ethylenic hydrocarbon. The liquid then descends into the lower part of the space 7 and re-enters the space 6. A fraction of the reaction liquid is extracted from the reactor through the pipe 20; this fraction is then treated in known manner, with a view to treating the 1,2-glycol monochlorohydrin which it contains.

The reactor according to the invention has several advantages over previously known apparatus, in the field of both construction and use. Thus, the reactor of the invention, particularly when it is shaped as a cylinder of revolution; is made up of members which are simply constructed and easily assembled, even with materials such as titanium. This single reactor alone replaces the complex installations previously known for the preparation of 1,2-glycol monochlorohydrins. This also makes it easier to solve the problems of vibration and of keeping under pressure, since only the external casing is subjected to this pressure. As far as its use is concerned, the reactor of the invention has the important advantage of limiting the formation of byproducts, such as chloroalkanes which are difficult to separate. It should be noted that this result surprisingly is obtained despite the fact that the supplies of ethylenic hydrocarbon introduced into the reactor may be very large.

Having described the basic concepts of the invention, reference is now made to the following specific example as an illustration of the use of the apparatus of the invention in the preparation of the chlorohydrin of propylene glycol using propylene as the ethylenic hydrocarbon.

EXAMPLE 1

Into a reactor made of titanium and constructed as shown in the FIGURE, there are introduced 180 parts by weight of water; when the apparatus has been purged with nitrogen, 4.63 parts by weight per hour of chlorine gas are introduced through the pipe 15 and 4.85 parts by weight of propylene gas through the pipe 17. The washer 10 is sprayed with 117.4 parts by weight of water. When balanced operating conditions are established, the temperature is 58°C. and the pressure 1.4 bars. 124 parts by weight per hour of a solution containing 4.5 percent by weight of chlorohydrin of the propylene glycol are tapped through the pipe 20. Allowing for the fact that 2.1 parts by weight per hour of non-consumed propylene which can be recycled are recovered through the vent 9, the chemical yield from the conversion of propylene to chlorohydrin of the propylene glycol is 90.2 percent. The chloropropane formed is approximately 0.076 molecule per molecule of chlorohydrin (9.1 percent by weight).

However, it will be understood that use can be made of a variety of ethylenic compounds. Preferred ethylenic compounds are olefins containing two to eight carbon atoms.

It will be apparent that various changes and modification can be made as to the details of procedure, construction and use without departing from the spirit of the invention, especially as defined in the following claims.

I claim:

1. A chemical reactor comprising a vertically disposed, generally cylindrical reaction vessel adapted to contain a liquid reaction medium, a first jacket defining a central chamber open at the lower portion thereof for communication with the vessel, a second jacket about the first jacket defining a first annular chamber between the first and second jackets and terminating in means for introducing a liquid reaction to the upper portion thereof, the upper portion of the first annular chamber communicating with the upper portion of the cylindrical chamber, means for introducing a gaseous first reactant into the lower portion of the first annular chamber to displace liquid in the first annular chamber upwardly therethrough, the second jacket including an inverted frusto-conical portion, with the first jacket terminating at substantially the level of the base of the frusto-conical portion whereby liquid flowing through the first annular chamber flows upwardly into a frusto-conical zone defined by the frusto-conical portion to minimize turbulence, a third jacket about the second jacket defining a second annular chamber therewith, the lower portion of which communicates with the lower portion of the first annular chamber, the third jacket also defining a third annular chamber with the walls of the vessel, said third annular chamber communicating with the central chamber at the lower portion thereof, a continuous spout connecting the second and third jackets whereby the lower portion of the second annular chamber communicates with the lower portion of the first annular chamber, means for feeding a second gaseous reactant to the lower portion of the third annular chamber for contact with liquid therein from the cylindrical chamber and to displace the liquid upwardly for passage to the second annular chamber, and means for removing a portion of the liquid from the second annular chamber.

2. A reactor as defined in claim 1 wherein the means for introducing the first gaseous reactant to the first annular chamber includes a plurality of diffusers spaced about the chamber.

3. A reactor as defined in claim 1 wherein the third jacket is formed at its upper portion in an inwardly extending lip to minimize the turbulence of liquid from the second annular chamber to the third annular chamber.

4. A reactor as defined in claim 1 which includes a counter-current washing column on the upper portion of the frusto-conical portion and means to add liquid to the column to wash gases from the frusto-conical portion.

5. A reactor as defined in claim 1 wherein each of the jackets are substantially cylindrical and coaxial each with the other.

* * * * *